United States Patent
Arimatsu et al.

(10) Patent No.: US 10,312,758 B2
(45) Date of Patent: Jun. 4, 2019

(54) HOLDING MEMBER, ROTOR OF A ROTATING ELECTRICAL MACHINE COMPRISING THE SAME, AND A ROTATING ELECTRICAL MACHINE COMPRISING THE ROTOR

(71) Applicant: FANUC CORPORATION, Yamanashi (JP)

(72) Inventors: Youhei Arimatsu, Yamanashi (JP); Shinobu Takano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 94 days.

(21) Appl. No.: 15/487,911

(22) Filed: Apr. 14, 2017

(65) Prior Publication Data
US 2017/0310175 A1 Oct. 26, 2017

(30) Foreign Application Priority Data

Apr. 22, 2016 (JP) ................. 2016-086495

(51) Int. Cl.
*H02K 21/12* (2006.01)
*H02K 1/28* (2006.01)
*H02K 1/27* (2006.01)

(52) U.S. Cl.
CPC ............ *H02K 1/28* (2013.01); *H02K 1/278* (2013.01)

(58) Field of Classification Search
CPC .......... H02K 1/27; H02K 1/28; H02K 1/2706; H02K 1/278

(Continued)

(56) References Cited

U.S. PATENT DOCUMENTS 4,678,954 A * 7/1987 Takeda ................... H02K 1/278
29/598
5,457,870 A * 10/1995 Canders ................. H02K 1/278
156/294

(Continued)

FOREIGN PATENT DOCUMENTS

| JP | S61-001246 A | 1/1986 |
| JP | S61-042257 A | 2/1986 |

(Continued)

OTHER PUBLICATIONS

An Office Action mailed by the Japanese Patent Office dated Mar. 20, 2018, which corresponds to Japanese Patent Application No. 2016-086495 and is related to U.S. Appl. No. 15/487,911.

*Primary Examiner* — Hanh N Nguyen
(74) *Attorney, Agent, or Firm* — Studebaker & Brackett PC

(57) ABSTRACT

To provide a holding member, a rotor including the holding member, and a rotating electrical machine including the rotor, in which there is no risk of the holding member grinding against the stator, while maintaining a sufficient tensile force of the holding member for the magnet in the rotor of the rotating electrical machine. The length of the main section in the axial direction is longer than the length of the stator core in the axial direction; and the terminally processed section is arranged so as to be located outside of the end of the stator core in the axial direction; the terminally processed section is the start point and the end point of winding the fiber bundle composing the holding member, and is located outside of the stator core; and the terminally processed section is relatively thick.

6 Claims, 14 Drawing Sheets

(58) Field of Classification Search
USPC .............................. 310/156.28, 156.31, 187
See application file for complete search history.

(56) References Cited

U.S. PATENT DOCUMENTS

| | | | |
|---|---|---|---|
| 6,441,523 B1* | 8/2002 | Koharagi | H02K 1/2733 |
| | | | 310/156.28 |
| 8,247,938 B2* | 8/2012 | Saban | H02K 1/02 |
| | | | 310/156.28 |
| 2006/0119197 A1* | 6/2006 | Puterbaugh | H02K 5/10 |
| | | | 310/87 |
| 2014/0300233 A1 | 10/2014 | Arimatsu | |

FOREIGN PATENT DOCUMENTS

| | | |
|---|---|---|
| JP | S61-035545 U | 3/1986 |
| JP | S61-207162 A | 9/1986 |
| JP | H11-089143 A | 3/1999 |
| JP | 2000-032689 A | 1/2000 |
| JP | 2002-315241 A | 10/2002 |
| JP | 2014-212680 A | 11/2014 |
| JP | 2015-144550 A | 8/2015 |

* cited by examiner

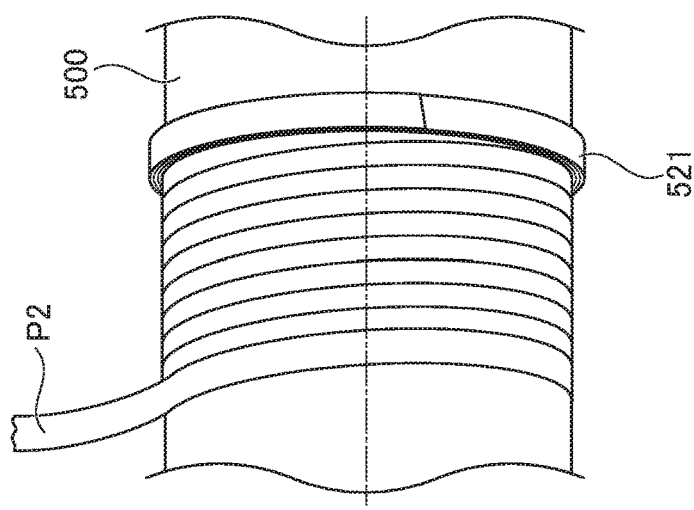
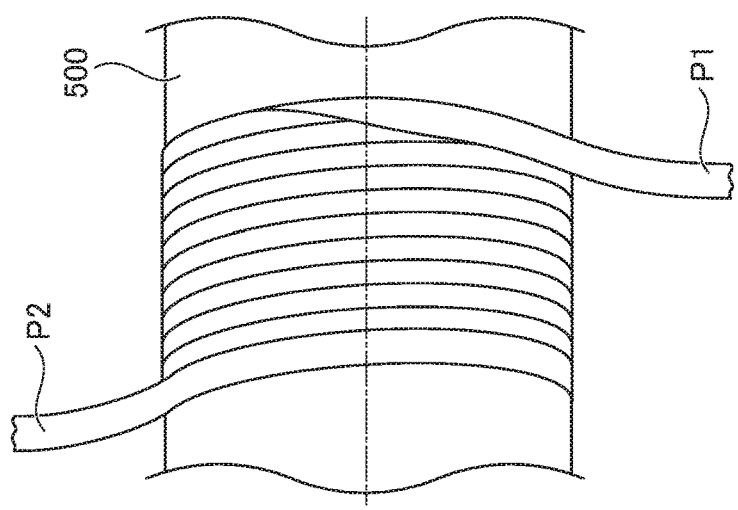
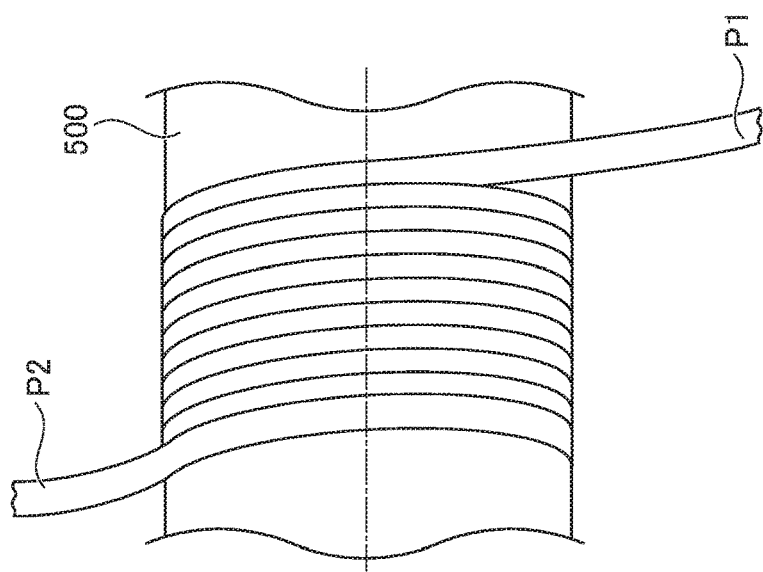

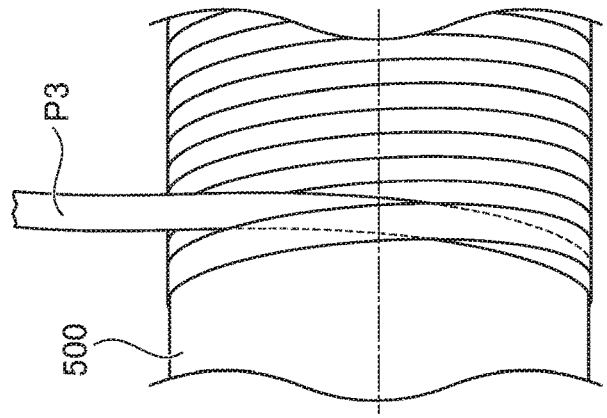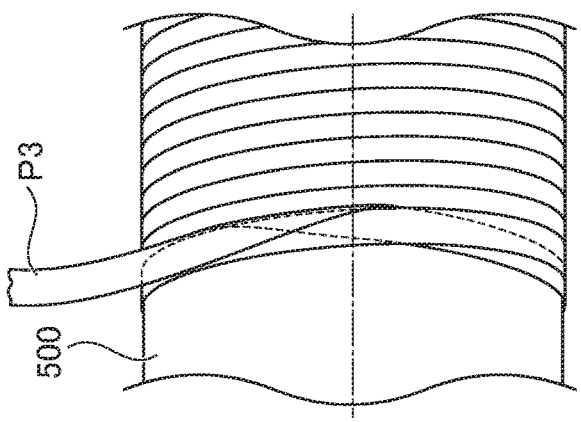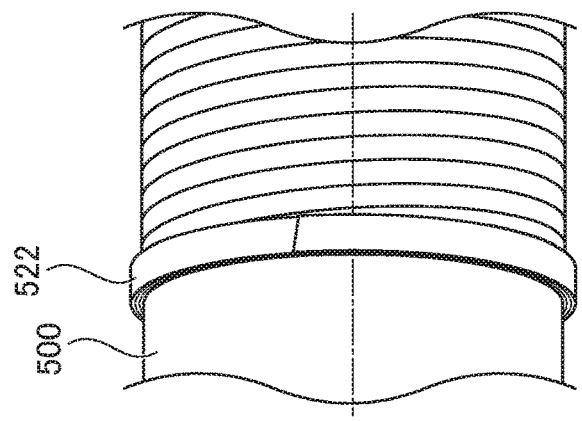

HOLDING MEMBER, ROTOR OF A ROTATING ELECTRICAL MACHINE COMPRISING THE SAME, AND A ROTATING ELECTRICAL MACHINE COMPRISING THE ROTOR

This application is based on and claims the benefit of priority from Japanese Patent Application No. 2016-086495, filed on 22 Apr. 2016, the content of which is incorporated herein by reference.

BACKGROUND OF THE INVENTION

Field of the Invention

The present invention relates to a holding member, a rotor including the holding member, and a rotating electrical machine including the rotor, in which the holding member is used around an outer periphery of the rotor of the rotating electrical machine.

Related Art

A synchronous motor has been heretofore known, in which a magnet is provided on an outer periphery of a rotor, and a cylindrical holding member compressively holds the magnet inwards in the radial direction. In order to enable this type of synchronous motor to achieve high-speed rotation, it is necessary to provide a holding member which is designed to be capable of withstanding a great centrifugal force, so as to prevent the magnet itself from being disengaged from the rotor, or the rotor itself from being damaged due to the centrifugal force. From such a standpoint, a rotating electrical machine has been proposed (for example, refer to Patent Document 1), in which a holding member made of carbon-fiber reinforced plastic (CFRP) is arranged on an outer periphery of a permanent magnet so as to cover the permanent magnet, and the holding member compressively holds the permanent magnet arranged on an outer periphery of a rotor. According to the technology disclosed in Patent Document 1, the length of the holding member is equal to the total length of the magnet section in the axial direction, and the length of the magnet section is approximately equal to the length of the stator core in the axial direction. Therefore, the dimension of the holding member in the axial direction is substantially the same as the dimension of the stator core in the axial direction, and the holding member is assembled almost fitly inside the stator core. Further, a structure of a holding member for preventing the end of winding a fiber bundle from peeling off has already been proposed (for example, refer to Patent Document 2).

Patent Document 1: Japanese Unexamined Patent Application, Publication No. 2014-212680

Patent Document 2: Japanese Unexamined Patent Application, Publication No. 2002-315241

SUMMARY OF THE INVENTION

When the holding member made of CFRP disclosed in Patent Document 1 is applied to a rotating electrical machine, it is easy to implement the technique to enhance the holding strength by increasing the circumferential tensile force acting on the holding member. However, in practice, as the tensile force increases, the start point or the end point of winding the fiber bundle of the holding member is more likely to peel off due to such a tensile force. Once the peeling off begins, the peeling off may gradually progress, leading to destruction in many cases. Thus, there is a limit on increasing the holding strength by simply increasing the tensile force without taking any countermeasure for this section.

In the case of a rotating electrical machine aiming at high-speed rotation, a holding member is formed as a cylindrical (tubular) FRP, in many cases, by winding a continuous fiber bundle in the shape of thread, string or tape on a jig serving as a core material. This type of manufacturing technique is referred to as filament winding (hereinafter referred to as FW). According to this type of manufacturing technique, in the state where a high tensile force is applied to the fiber wound and formed into a cylindrical shape, if any further severe environmental condition is added, there will be problems such as untying the fixed terminal at the start point or the end point of the winding. Examples of such severe environmental conditions may include friction with wind due to high-speed rotation, vibrations, high temperature due to heat generation of a rotor, a temperature cycle between the rotating hours and the shutdown hours, etc. As a countermeasure against the above-described problems, it is possible to employ a method, in which a holding member is produced by way of FW and is elaborately fixed by increasing the count of winding a fiber bundle only at the start point and the end point. However, such a method may increase the thickness in the radial direction, bringing about a risk that the holding member may grind against the stator core. If the holding member grinds against the stator core, such grinding would as a consequence cause a problem that the fixed terminal point may be untied.

If a rotating electrical machine is aimed to further speed up, a centrifugal force generated in a magnet will also be increased, and a tensile force of the fiber of the holding member needs to be increased, accordingly. Further, as an example of a technique to achieve a higher output of an electric motor, a method of increasing the thickness of the magnet is conceivable. When the magnet is thickened, the mass of the magnet will increase, and the centrifugal force generated in the magnet will also increase, accordingly. Therefore, the tensile force of the fiber of the holding member needs to be increased in order to be able to withstand the increased centrifugal force. However, if the tensile force of the fiber bundle is increased by manufacturing a holding member by way of FW with the method as described above, the diameter of the holding member will be increased at the start point and the end point of winding the fiber bundle, causing a problem that the holding member may grind against the stator core, which may eventually untie the fixation. This problem has been a barrier to increasing the speed and output of conventional rotating electrical machines.

Further, Patent Document 2 discloses a technique, in which members such as a rotor housing and a flange are provided with a fiber-tying portion for restraining the end of the fiber. However, according to this technique, the mass of the rotor housing and the flange would be a barrier to higher rotation speed. As a result, even if a magnet portion is held by way of lightweight fiber, the strength against a centrifugal force of the rotor housing and the flange is insufficient, which would cause a problem of restriction on the maximum rotation speed. In order to solve this problem, it is necessary to terminally process the start point and the end point of winding the fiber bundle of the holding member so as to be firmly and reliably strengthened, and not to be untied even under a high tensile force.

The present invention has been made in view of the circumstances as described above, and an object of the present invention is to provide a holding member, a rotor including the holding member, and a rotating electrical machine including the rotor, in which there is no risk of the holding member grinding against the stator, while maintaining a sufficient tensile force of the holding member for the magnet in the rotor of the rotating electrical machine.

(1) A holding member (e.g., holding member 50 to be described later) according to the present invention is a holding member applied to a rotating electrical machine, the rotating electrical machine including: a stator (e.g., stator 20 to be described later) including a stator core (e.g., stator core 21 to be described later); a rotor (e.g., rotor 10 to be described later) supported by way of a rotating shaft (e.g., rotating shaft 1 to be described later) and corresponding to the stator; a plurality of magnets (e.g., magnets M to be described later) arranged on an outer periphery of the rotor; and a holding member (e.g., holding member 50 to be described later) that compressively holds the magnets (M) inwards in a radial direction from an outer periphery side of the magnets (M), in which the holding member includes: a main section (e.g., main section 51 to be described later) that forms a substantially cylindrical body and is composed primarily of a fiber bundle wound on, as circling around, a peripheral surface of the main section per se; and a terminally processed section (e.g., terminally processed section 52 to be described later) provided at an end of the main section, the terminally processed section including a region that is terminally processed for preventing the fiber bundle from being untied from at least any one of a start point and an end point of winding the fiber bundle, and in which a length of the main section in an axial direction is longer than a length of the stator core in the axial direction; and the terminally processed section is arranged so as to be located outside of an end of the stator core in the axial direction.

(2) The holding member according to the first aspect of the present invention may take a second aspect, in which the terminally processed section includes a first terminally processed section and a second terminally processed section, and in which an external diameter of at least the first terminally processed section is larger than an external diameter of the main section.

(3) The holding member according to the second aspect of the present invention may take a third aspect, in which an external diameter of the second terminally processed section is smaller than an inner diameter of the stator core.

(4) A fourth aspect of the present invention is a rotor including the holding member according to any one of the first to third aspects.

(5) The rotor according to the fourth aspect of the present invention may take a fifth aspect, in which a length of the holding member in the axial direction is equal to a length of the magnets in the axial direction.

(6) The rotor according to the fourth or fifth aspect of the present invention may take a sixth aspect, in which an outer periphery of the rotating shaft coaxially includes: the holding member configured to include carbon fiber; and a tapered sleeve located further inwards in relation to the holding member in a radial direction, the tapered sleeve including a tapered surface, an inner periphery of which is sloped in the axial direction, in which the holding member receives a radially expanding force from the tapered surface on the outer periphery of the rotating shaft, the holding member is fitted to the rotating shaft via the magnets and the tapered sleeve, whereby a tensile force acts on the holding member; and the tensile force generates an elastically compressive force, which in turn presses the magnets against the outer periphery of the tapered sleeve.

(7) A seventh aspect of the present invention is a rotating electrical machine, in which an end of the stator core according to the fifth aspect of the present invention composes a section configured with a countermeasure to prevent a laminated core from peeling off.

(8) An eighth aspect of the present invention is a rotating electrical machine including the rotor according to any one of the fourth to sixth aspects of the present invention, in which the terminally processed section of the holding member is located outside of an end of the stator core in the axial direction.

The present invention can realize a holding member, a rotor including the holding member, and a rotating electrical machine including the rotor, in which there is no risk of the holding member grinding against the stator, while maintaining a sufficient tensile force of the holding member for the magnet in the rotor of the rotating electrical machine.

BRIEF DESCRIPTION OF THE DRAWINGS

FIG. 8A is a diagram for illustrating an example of the terminal processing at a start point of winding a fiber bundle of the holding member as an embodiment of the present invention, in which an aspect of starting winding the fiber bundle is illustrated;

FIG. 8B is a diagram for illustrating an example of the terminal processing at the start point of winding the fiber bundle of the holding member as an embodiment of the present invention, in which an aspect of preparing the terminal processing is illustrated;

FIG. 8C is a diagram for illustrating an example of the terminal processing at the start point of winding the fiber bundle of the holding member as an embodiment of the present invention, in which an aspect of the terminal processing is illustrated;

FIG. 10A is a diagram for illustrating an example of the terminal processing at an end point of winding the fiber bundle of the holding member as an embodiment of the present invention, in which an aspect of finishing winding the fiber bundle is illustrated;

FIG. 10B is a diagram for illustrating an example of the terminal processing at the end point of winding the fiber bundle of the holding member as an embodiment of the present invention, in which an aspect of preparing the terminal processing is illustrated;

FIG. 10C is a diagram for illustrating an example of the terminal processing at the end point of winding the fiber bundle of the holding member as an embodiment of the present invention, in which an aspect of the terminal processing is illustrated;

DETAILED DESCRIPTION OF THE INVENTION

Figure 1:
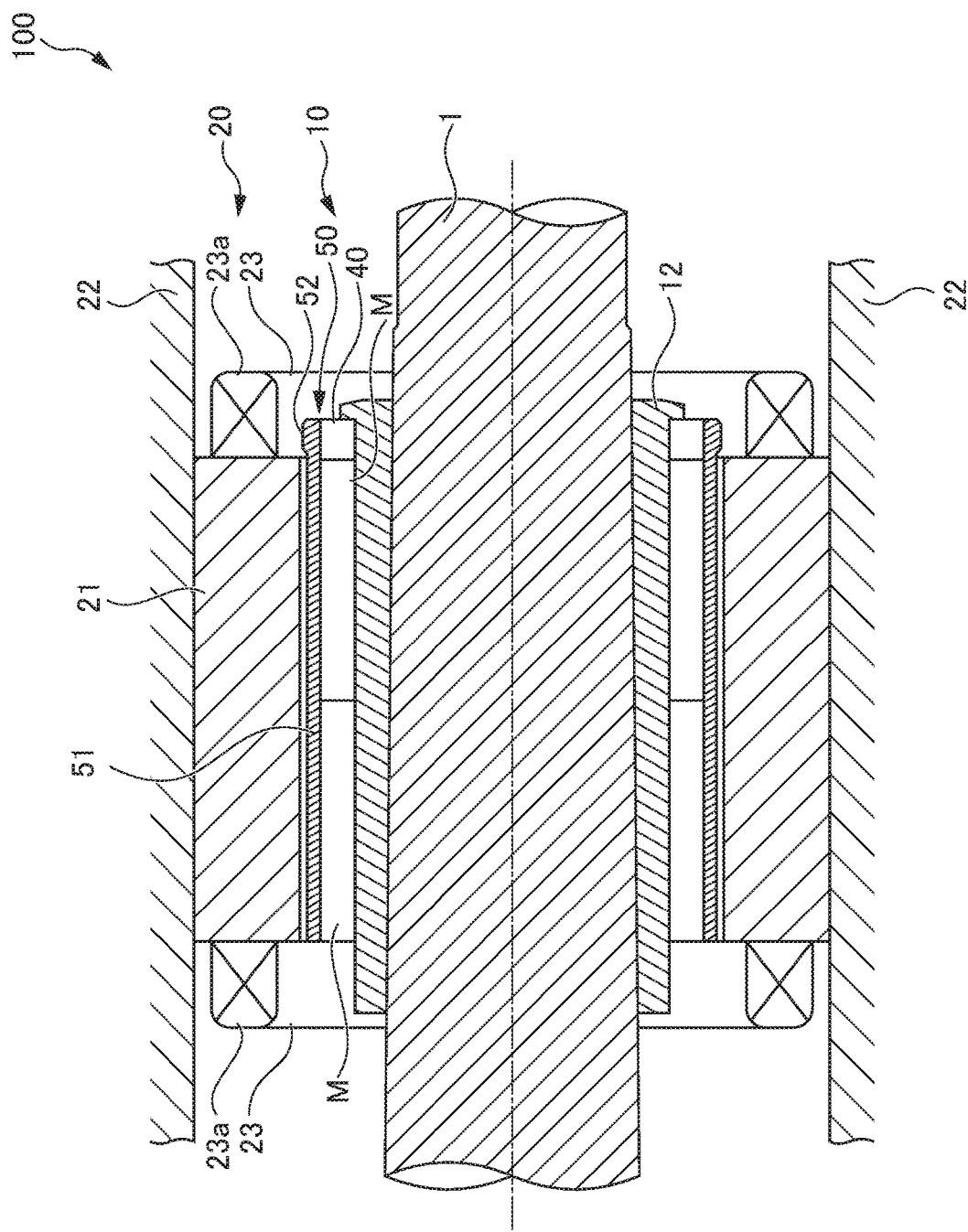
FIG. 1 is a schematic configuration diagram illustrating a rotating electrical machine as an embodiment of the present invention.

An embodiment of the present invention is hereinafter described with reference to the drawings, in comparison with a conventional typical rotating electrical machine, as appropriate. FIG. 1 is a schematic configuration diagram illustrating a rotating electrical machine as an embodiment of the present invention. A rotating electrical machine 100 includes a rotor 10 as an embodiment of the present invention; and the rotor 10 includes a holding member 50 as an embodiment of the present invention. In the rotating electrical machine 100 illustrated in FIG. 1, the rotor 10 is supported by way of a rotating shaft 1, both end sides of which are supported by way of bearings (not illustrated). A stator 20 is provided so as to surround the rotor 10. The stator 20 includes a stator core 21 formed by laminating, for example, thin magnetic steel sheets, and is incorporated in a housing 22. A coil 23 is wound on the stator core 21. A coil end 23a of the coil 23 wound on the stator core 21 is visible in the perspective of FIG. 1.

The rotating electrical machine 100 illustrated in FIG. 1 is a surface-mounted permanent-magnet synchronous motor, in which axially divided permanent magnets M are fixed to the rotating shaft 1 by way of a tapered sleeve 12 and the holding member 50. Namely, in the rotating electrical machine 100, the cylindrical tapered sleeve 12 made of a magnetic metallic material is press-fitted between the annular permanent magnets M and the rotating shaft 1; and the permanent magnets M are further surrounded by the holding member 50 that compressively holds the permanent magnets M inwards in the radial direction from the outer peripheral surface side; whereby the permanent magnets M are firmly held to the outer periphery of the rotating shaft 1 (directly to the tapered sleeve 12). Note that an annular spacer 40 having the same radial thickness dimension as the permanent magnets M is fitted at the end of one of the permanent magnets M (the right magnet M in FIG. 1). The spacer 40 has a shape resembling the shape of the end of the permanent magnet M in the axial direction.

The holding member 50 includes: a main section 51 which forms a substantially cylindrical body and is composed primarily of a fiber bundle (to be described later) wound on, as circling around, the peripheral surface of the holding member 50; and a terminally processed section 52 which is provided at the end of the main section 51, and which includes a region terminally processed for preventing the fiber bundle from being untied from at least any one of a start point and an end point of winding the fiber bundle.

As illustrated in FIG. 1, the main section 51 and the terminally processed section 52 are substantially uniform in the inner diameter, and therefore have a step-less inner periphery which is continuous in the axial direction. However, an external diameter of the terminally processed section 52 is larger than an external diameter of the main section 51; therefore, a transition section from the outer periphery of the main section 51 to the outer periphery of the terminally processed section 52 has a step where the diameter is increased. The reason for this will be described later.

The length of the main section 51 of the holding member 50 in the axial direction is longer than the length of the stator core 21 in the axial direction; and the terminally processed section 52 is arranged so as to be located outside of the end of the stator core 21 in the axial direction.

As can be easily understood with reference to FIG. 1, the length of a section in which the permanent magnets are arranged, i.e. the total length of the axially divided permanent magnets M in the axial direction, is substantially equal to the length of the stator core 21 in the axial direction. Further, a length of a section, in which the axially divided permanent magnets M and the spacer 40 are aligned in the axial direction, is substantially equal to the length of the holding member 50 including the terminally processed section 52 in the axial direction. As illustrated in FIG. 1, the spacer 40 is inserted between the inner periphery side of the terminally processed section 52 of the holding member 50 and the outer periphery side of the tapered sleeve 12.

The tapered sleeve 12 includes a tapered surface, an inner periphery of which is sloped in the axial direction. Namely, the inner diameter of the tapered sleeve 12 decreases towards the right side in the perspective of FIG. 1. Further, another tapered surface, which is tapered in an orientation similar to the tapered sleeve 12, is formed on an outer periphery of the rotating shaft 1 as well. The holding member 50 receives a radially expanding force from the tapered surface on the outer periphery of the rotating shaft 1, and the holding member 50 is fitted to the rotating shaft 1 via the permanent magnets M and the tapered sleeve 12, whereby a tensile force acts on the holding member 50. The tensile force acting on the holding member 50 generates an elastically compressive force, which in turn presses the permanent magnets M against the outer periphery of the tapered sleeve 12. As a result, the permanent magnets M are firmly held in their position.

Figure 2:
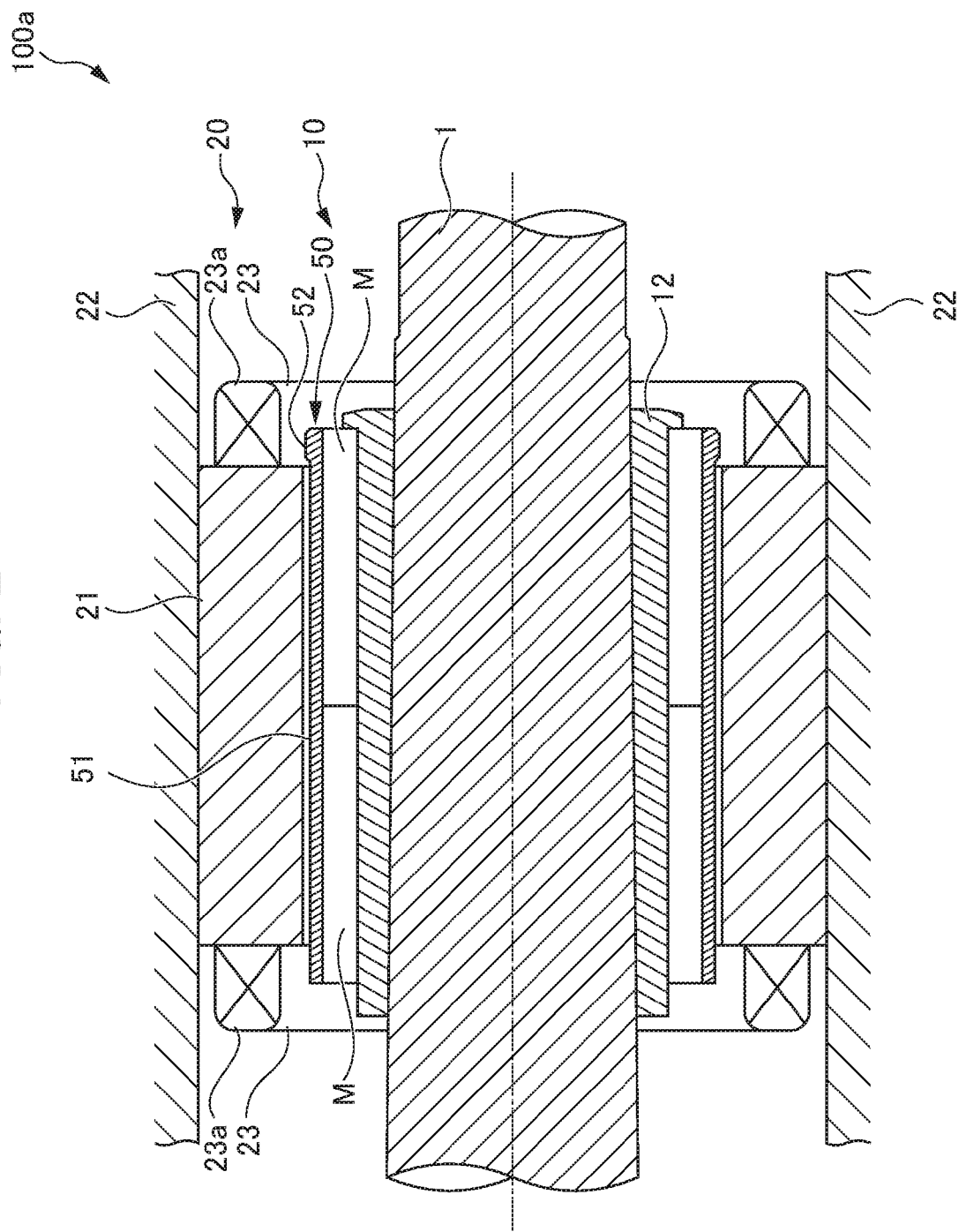
FIG. 2 is a schematic configuration diagram illustrating an alternative embodiment of the rotating electrical machine illustrated in FIG. 1.

FIG. 2 is a schematic configuration diagram illustrating an alternative embodiment of the rotating electrical machine illustrated in FIG. 1. In FIG. 2, elements corresponding to those described above in FIG. 1 are denoted by the same reference numbers, respectively; and the descriptions in FIG. 1 shall apply to descriptions of the corresponding elements in FIG. 2. A rotating electrical machine 100a illustrated in FIG. 2 is also a surface-mounted permanent-magnet synchronous motor. Differences between the rotating electrical machine 100a illustrated in FIG. 2 and the rotating electrical machine 100 described above in FIG. 1 are as follows. Namely, in the rotating electrical machine 100, the total length of the permanent magnets M in the axial direction (the total length described above) is substantially equal to the length of the stator core 21 in the axial direction, and the spacer 40 is fitted to the inner periphery side of the terminally processed section 52 of the holding member 50; whereas, in the rotating electrical machine 100a, the total length of the permanent magnets M in the axial direction is longer than the length of the stator core 21 in the axial direction, and the spacer 40 is not provided. As can be easily understood with reference to FIG. 2, both ends of the permanent magnets M in the axial direction respectively extend from both ends of the stator core 21 in the axial direction, for a substantially equal length. Therefore, if the rotating shaft 1 is about to be displaced in the axial direction, the rotating shaft 1 will be pulled back to the normal position (original position) and balanced by way of an attractive force of the lines of magnetic flux of the permanent magnets M. Therefore, the rotating shaft 1 maintains the normal position with a high degree of accuracy, without causing a load on the bearings (not illustrated). The rotating electrical machine 100a illustrated in FIG. 2 is also provided with the tapered sleeve 12, in which the above-described tapered surface is formed on the outer periphery of the rotating shaft 1. Therefore, as described above in relation to the rotating electrical machine 100 in FIG. 1, the elastically compressive force of the holding member 50 firmly holds the permanent magnets M in their position on the outer periphery of the tapered sleeve 12.

Figure 3:
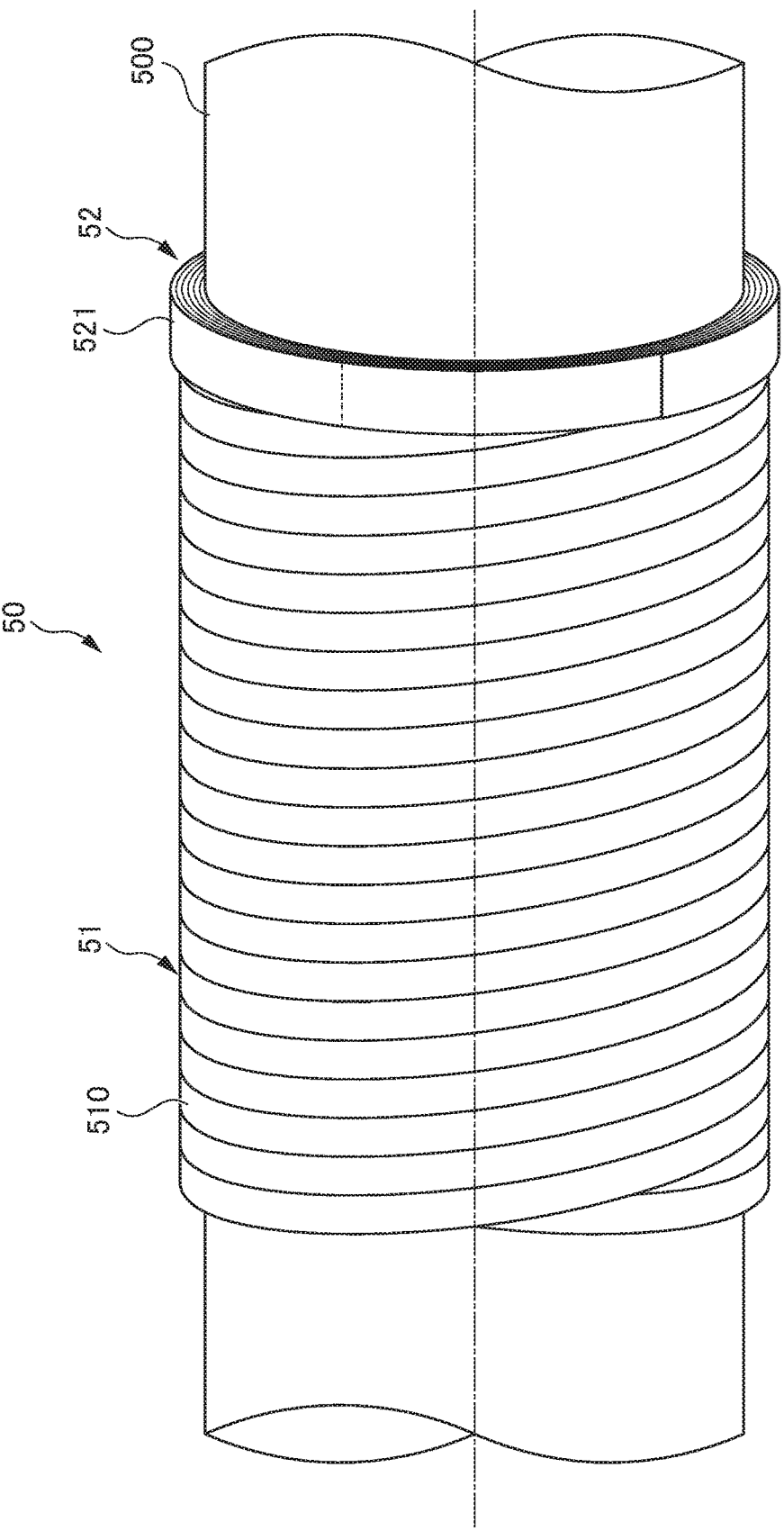
FIG. 3 is a diagram for illustrating a holding member as an embodiment of the present invention, which is applied to the rotating electrical machine illustrated in FIGS. 1 and 2.

Here, the holding member 50 illustrated in FIGS. 1 and 2 is further described with reference to FIG. 3. FIG. 3 is a diagram for illustrating the holding member as an embodiment of the present invention, which is applied to the rotating electrical machine illustrated in FIGS. 1 and 2. In particular, FIG. 3 illustrates an aspect during the process of forming the holding member 50. As described above with reference to FIGS. 1 and 2, the holding member 50 includes the main section 51 which forms a substantially cylindrical body and is composed primarily of a fiber bundle (to be described later) wound on, as circling around, the peripheral surface of the holding member 50. The holding member 50 further includes the terminally processed section 52, which is provided at the end of the main section 51, and which includes a region terminally processed for preventing the fiber bundle from being untied from at least any one of the start point and the end point of winding the fiber bundle.

It is recommended that the fiber serving as a material for the above-mentioned holding member 50 is carbon fiber (hereinafter, such fiber is simply referred to as fiber, including the fiber being the fiber bundle 510, as appropriate). The holding member 50 is formed by winding such a fiber bundle 510 on a formation jig 500 having an axial shape as illustrated in FIG. 3. According to one formation method, firstly, the material fiber is wound on the formation jig 500. The material fiber wound on the formation jig 500 is impregnated with a highly osmotic resin by way of dropwise application or the like, and the resin is subsequently heated and cured. The resin in this case is preferably an elastic resin.

In the case of the holding member 50 illustrated in FIG. 3, the start point and the end point of winding the fiber bundle are located at the same side, and bonded and fixed together thereby being terminally processed. The terminal processing is intended to prevent the fiber bundle from being untied from the end, and epoxy resin is used as an adhesive for the terminal processing. Further, in the case of the holding member 50 illustrated in FIG. 3, the terminally processed section 52 is created at one end of the holding member 50 in the axial direction (the right side in the perspective of FIG. 3); and the fiber bundle 510 is turned around at the other end of the holding member 50 without changing the winding direction. Namely, at the terminally processed section 52, the start point and the end point of winding the fiber bundle 510 are overlapped to produce a section 521 multiply winding the fiber bundle. Therefore, the section 521 multiply winding the fiber bundle 510 forms the terminally processed section 52, which has a step, the external diameter of which is larger than that of the main section 51.

After heating and curing the resin as described above, the holding member 50 is withdrawn from the formation jig 500 in the axial direction, and is singly taken out to become the holding member 50 as a finished article. Instead of the above-described technique to heat and cure the highly osmotic resin dropped and impregnated into the fiber bundle, the holding member 50 can also be formed by using a technique to heat and cure a prepreg tape wound on the formation jig 500.

Since the holding member 50 is formed as described above, the main section 51 and the terminally processed section 52 are substantially uniform in the inner diameter, and therefore have a step-less inner periphery which is continuous in the axial direction. On the other hand, since the terminally processed section 52 is the section 521 multiply winding the fiber bundle 510, the external diameter of the terminally processed section 52 is larger than the external diameter of the main section 51; therefore, the transition section from the outer periphery of the main section 51 to the outer periphery of the terminally processed section 52 has a step where the diameter is increased.

As a result, the terminally processed section 52 of the holding member 50 forms a region, the external diameter of which is the largest of all of the external diameters in the whole section of the holding member 50 in the axial direction.

The holding member 50, which is formed as described above with reference to FIG. 3, is mounted to the rotating electrical machine 100 (100a) as illustrated in FIGS. 1 and 2. In the state where the holding member 50 is mounted, a string of continuous fiber bundle is wound on, as circling around, the outer periphery of the rotor 10 from one end to the other end in the axial direction, at least in the section from one end to the other end of the rotor 10. Namely, the holding member 50 is formed by repeatedly winding the fiber bundle at least once or more than once, and will take a substantially cylindrical shape. The start point and the end point of winding the fiber bundle are located at one end of the holding member 50 in the axial direction (the right side in FIGS. 1, 2 and 3), and the end fibers are bonded together to be terminally processed for preventing the fibers from being untied. The technique illustrated in FIG. 3 forms the holding member 50 of a fiber reinforced resin having a resin matrix, in which a tensile force is not applied to the fiber composing the holding member 50 alone. In the cases illustrated in FIGS. 1, 2 and 3, the total length of the holding member 50 in the axial direction is longer than the length of the stator core 21 in the axial direction. Therefore, the end side of the holding member 50 can be located outside of the end of the stator core 21 in the axial direction; and there is no difficulty in designing the external diameter of the holding member 50 to be larger at the end side of the holding member 50. Therefore, the holding member 50 can be manufactured to be sufficiently strong against a circumferential tensile force.

Figure 4:
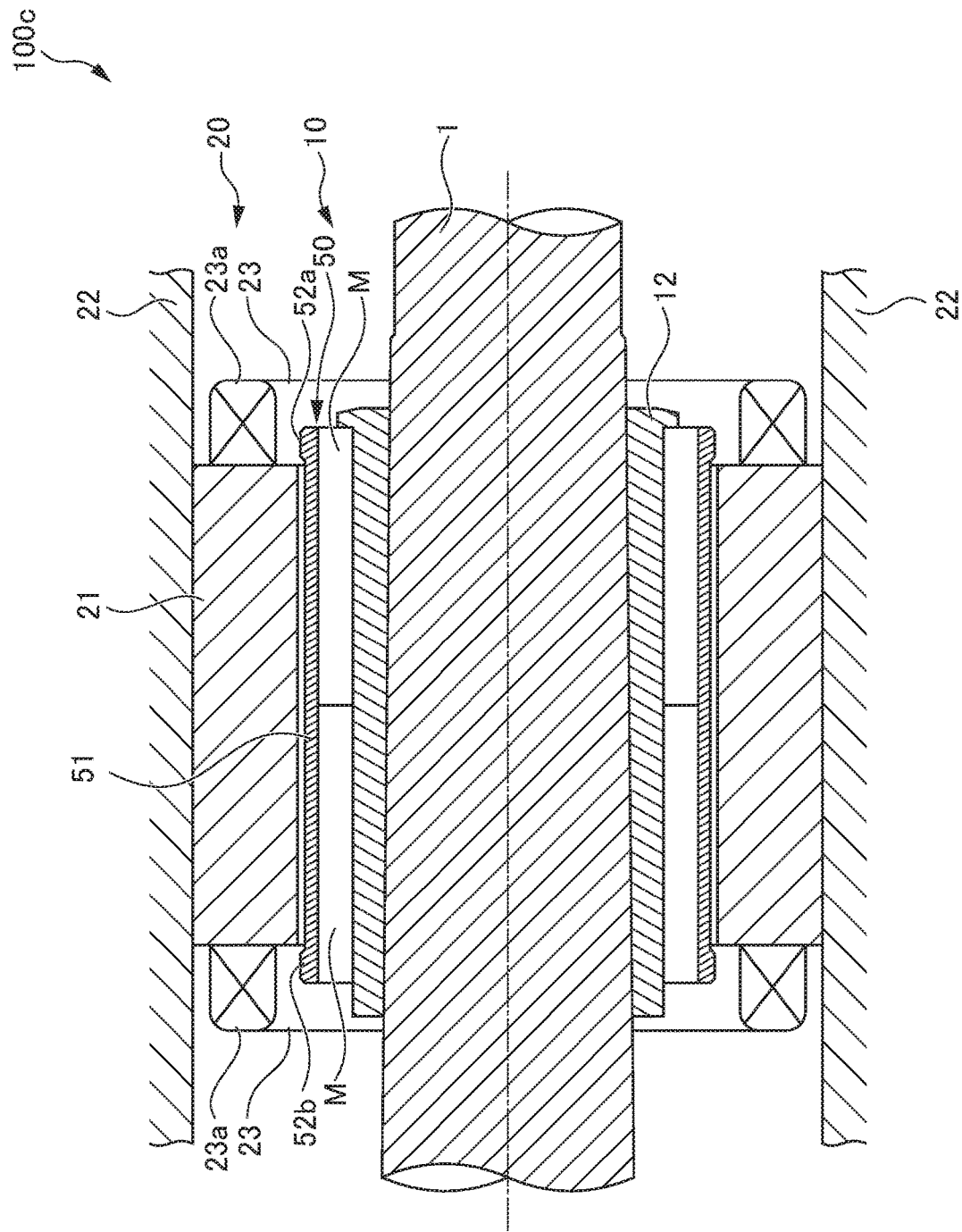
FIG. 4 is a schematic configuration diagram illustrating a rotating electrical machine as another embodiment of the present invention.

Next, with reference to FIG. 4, a rotating electrical machine as another embodiment of the present invention is described. FIG. 4 is a schematic configuration diagram illustrating a rotating electrical machine as another embodiment of the present invention. A rotating electrical machine 100c illustrated in FIG. 4 is also a surface-mounted permanent-magnet synchronous motor; elements corresponding to those described above in FIGS. 1 and 2 are denoted by the same reference numbers, respectively; and the descriptions in FIGS. 1 and 2 shall apply to descriptions of the corresponding elements.

Differences between the rotating electrical machine 100c illustrated in FIG. 4 and the rotating electrical machines 100a and 100b described above with reference to FIGS. 1 and 2 are as follows. Namely, in the rotating electrical machines 100a and 100b, the holding member 50 of the rotor 10 includes the terminally processed section 52 having a large external diameter at one end of the main section 51; whereas, in the rotating electrical machine 100c illustrated in FIG. 4, the holding member 50 of the rotor 10 includes terminally processed sections 52a and 52b having a large diameter at both ends of the main section 51, respectively.

Figure 5:
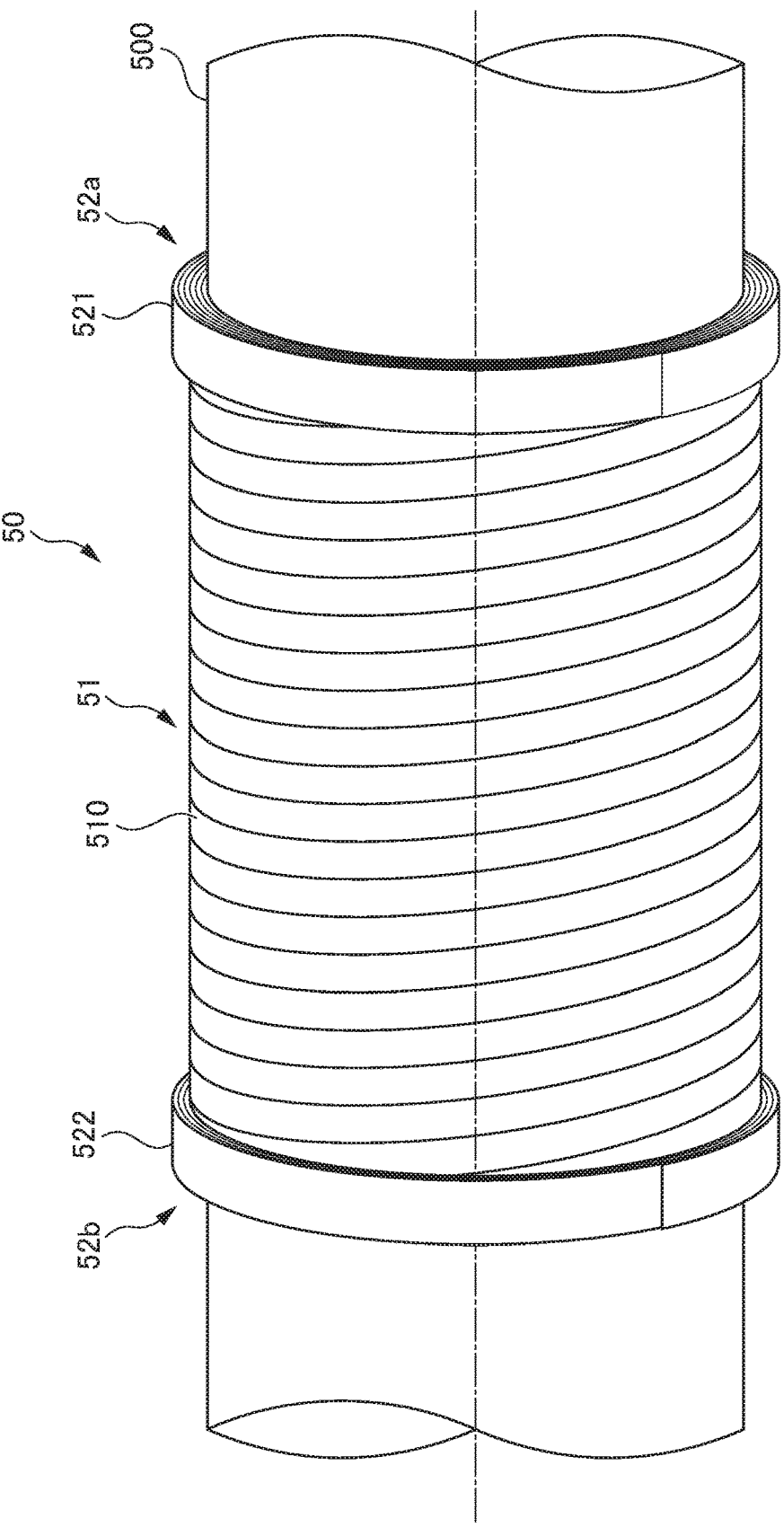
FIG. 5 is a diagram for illustrating a holding member as an embodiment of the present invention, which is applied to the rotating electrical machine illustrated in FIG. 4.

The holding member 50 in the rotating electrical machine 100c illustrated in FIG. 4 is described with reference to FIG. 5. FIG. 5 is a diagram for illustrating the holding member as an embodiment of the present invention, which is applied to the rotating electrical machine illustrated in FIG. 4. In FIG. 5, elements corresponding to those described above in FIG. 3 are denoted by the same reference numbers, respectively; and the descriptions in FIG. 3 shall apply to descriptions of the corresponding elements in FIG. 5. Similar to FIG. 3, FIG. 5 also illustrates an aspect during the process of forming the holding member 50. In the holding member 50 illustrated in FIG. 5, a section 521 multiply and elaborately winding the fiber bundle at the start point is terminally processed for fixation by way of an adhesive; and similarly, a section 522 multiply and elaborately winding the fiber bundle at the end point of winding the fiber bundle is terminally processed for fixation by way of an adhesive.

In the holding member 50 illustrated in FIG. 5, the diameter of the sections 521 and 522 multiply winding the fiber bundle is larger than the diameter of the section composing the main section 51 winding the fiber bundle 510. As a result, in the holding member 50 illustrated in FIG. 5, the terminally processed sections 52a and 52b having a large external diameter are formed at both ends of the main section 51 in the axial direction. In the holding member 50 illustrated in FIGS. 4 and 5 as well, the total length of the holding member 50 in the axial direction is longer than the length of the stator core 21 in the axial direction. In the present embodiment, in particular, both of the terminally processed sections 52a and 52b having a large diameter are assembled so as to be located outside of the stator core 21 in the axial direction.

Figure 6:
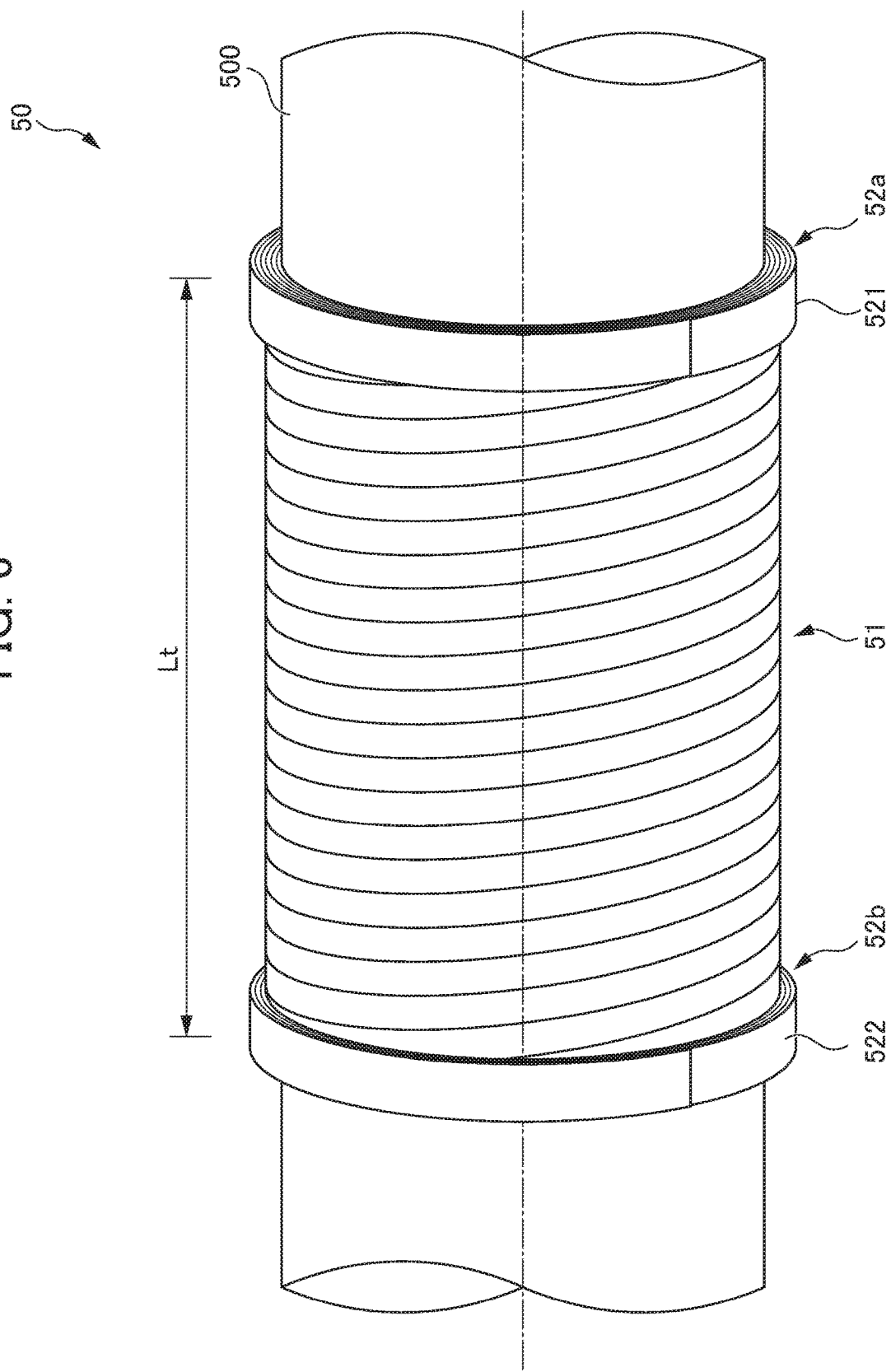
FIG. 6 is a diagram for illustrating an example of terminal processing for a holding member as an embodiment of the present invention.

The terminal processing for the holding member 50 is further described with reference to the drawings. FIG. 6 is a diagram for illustrating an example of the terminal processing for the holding member as an embodiment of the present invention. The holding member 50 is formed by winding the fiber bundle on the outer periphery of the formation jig 500 having an axial shape. In the holding member 50, the section 521 multiply and elaborately winding the fiber bundle at the start point of winding the fiber bundle is terminally processed for fixation by way of an adhesive. Such terminal processing forms the terminally processed section 52a having a large external diameter. Similarly, the section 522 multiply and elaborately winding the fiber bundle at the end point of winding the fiber bundle is also terminally processed for fixation by way of an adhesive. Such terminal processing forms the terminally processed section 52b having a large external diameter. For example, an adhesive such as epoxy resin is used for the terminal processing described above.

One section from one end to the other end of the holding member 50 in the axial direction in the rotor 10 is hereinafter referred to as a traverse, which is denoted by Lt in FIG. 6. At least in one traverse section Lt, a string of continuous fiber bundle is wound on, as circling around, the outer periphery to form the holding member 50. The winding of the continuous fiber bundle 510 is reciprocated in the axial direction multiple times, winding forward, turning backward at an end, and in reverse again, in the axial direction, while maintaining the winding direction. Namely, in the one traverse section Lt in the holding member 50, a string of the continuous fiber bundle is wound on, as circling around, the outer periphery of the rotor 10 from one end to the other end, thereby forming a substantially cylindrical body which is the main section of the holding member 50. The terminally processed sections 52a and 52b include the regions terminally processed for preventing the fiber bundle from being untied or entangled, and are formed at the start point and the end point of winding the fiber bundle.

Further, at the start point and the end point of winding the fiber bundle, i.e. at the terminally processed sections 52a and 52b, the fiber bundle is multiply wound and overlapped, as described above. At the terminally processed section 52a which is the start point of winding the fiber bundle, the winding of the fiber bundle is started from the inner periphery side; the end of the wound fiber bundle is pulled out to the outer periphery side; the fiber bundle is wound thereon at least one cycle on the same periphery; and an adhesive such as epoxy resin is applied and cured at a section where the fiber bundle is overlapped, thereby completing the fixation, i.e. the terminal processing, of the start point of the winding. Also at the terminally processed section 52b which is the end point of winding the fiber bundle, the fiber bundle is wound in a manner similar to the above-described manner, and an adhesive such as epoxy resin is applied and cured at a section where the fiber bundle is overlapped, thereby completing the fixation, i.e. the terminal processing, of the end point of the winding. The terminally processed sections 52a and 52b which are the ends of the holding member 50 are firmly hardened by curing the epoxy resin, etc.; however, the traverse section Lt is desirably impregnated with highly elastic resin.

As described above, the holding member 50 is formed such that the total length of the holding member 50 in the axial direction is longer than the length of the stator core 21 in the axial direction. As a result, when the rotating electrical machine 100c is assembled, both of the terminally processed sections 52a and 52b extend outwards from the stator core 21 in the axial direction. Therefore, even if the external diameter of the terminally processed sections 52a and 52b is large, the terminally processed sections 52a and 52b would not grind against the stator core 21. Therefore, by elaborately winding and overlapping a larger amount of fiber by using a sufficient amount of adhesive, it is possible to terminally process the terminally processed sections 52a and 52b such that the fiber can be prevented from loosening or being untied or entangled. In the case of conventional rotating electrical machines in general, since the terminal processing on the terminally processed sections 52a and 52b would increase the external diameter thereof, the terminally processed sections would grind against the inner periphery of the stator core 21, which may in turn break the fiber; however, the present invention can avoid such a defect.

Figure 7:
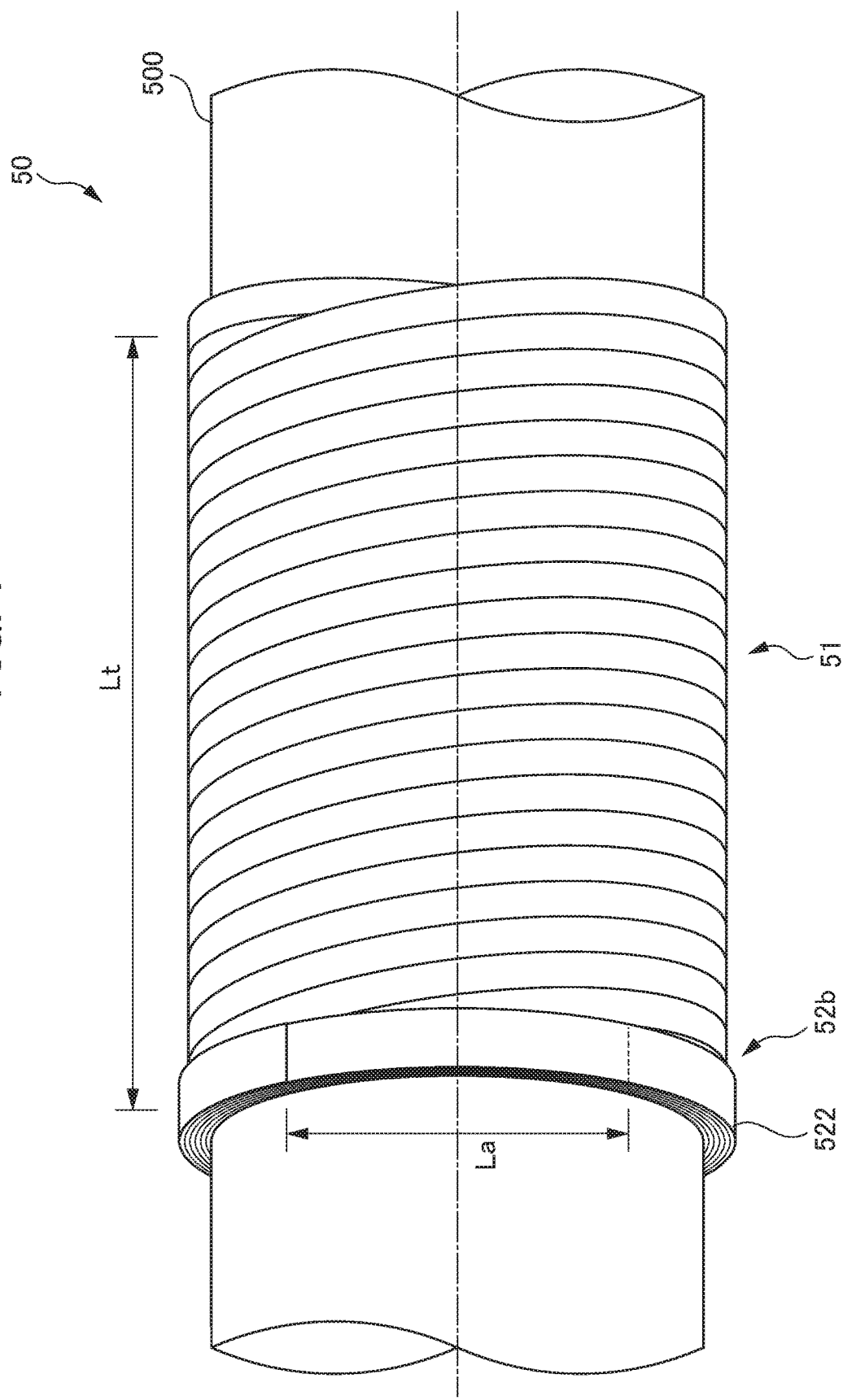
FIG. 7 is a diagram for illustrating another example of the terminal processing for the holding member as an embodiment of the present invention.

FIG. 7 is a diagram for illustrating another example of the terminal processing for the holding member as an embodiment of the present invention. Similar to the above-described example, firstly, the fiber bundle is wound on the outer periphery of the formation jig 500, forward from one end to the other end in the axial direction, and upon finishing winding the fiber for the one traverse section Lt, the fiber bundle is wound backward in the axial direction, while maintaining the winding direction. In this manner, the fiber bundle is repeatedly wound forward and backward in the axial direction multiple times, thereby forming the radially thick main section 51 of the holding member 50 in the traverse section Lt.

In the present embodiment, the start point and the end point of winding the fiber bundle are located at the same side (the left side in the perspective of FIG. 7), in which the section 522 multiply winding the fiber bundle is formed so as not to loosen. The section 522 multiply winding the fiber bundle includes a section La, in which the start point and the end point of the winding are overlapped; and epoxy resin is applied, bonded and cured at the section La, thereby completing the fixation, i.e. the terminal processing, at the end of the winding. The external diameter of the terminally processed section 52b being terminally processed is larger than the external diameter of the main section 51 of the holding member 50. Therefore, the terminally processed section 52b is eventually assembled to be located outside of the stator core 21 of the rotating electrical machine 100a or 100b in the axial direction. The start point of winding the fiber bundle will be the innermost when the fiber bundle is wound and overlapped; therefore, prior to starting winding the fiber bundle, the start point is pulled out of the section in advance, which will be the section 522 multiply winding the fiber bundle. This section, which is pulled out in advance as described above, is drawn to the outer periphery side, along the edge face of the section in which the fiber bundle is successively wound.

FIGS. 8A, 8B and 8C are diagrams for illustrating an example of the terminal processing at the start point of winding the fiber bundle of the holding member as an embodiment of the present invention. In the drawings, P1 denotes a fiber bundle to the start point side, and P2 denotes a fiber bundle to be wound to the end point side. FIG. 8A illustrates an aspect of starting winding the fiber bundle; FIG. 8B illustrates an aspect of preparing the terminal processing at the start point of winding the fiber bundle; and FIG. 8C illustrates an aspect of performing the terminal processing at the start point of winding the fiber bundle. As illustrated in FIG. 8A, when the winding of the fiber bundle is started by using the formation jig 500, in order to prevent the start point of the fiber bundle from being buried in the bottom layer by repeatedly winding the fiber bundle, an extra length of the start point of the fiber bundle is pulled out in advance prior to starting winding. As illustrated in FIG. 8B, the end of the fiber bundle, an extra length of which has been pulled out in advance as described above, is turned around along the border of the winding, and is wound on the outer periphery along the end of the winding. As illustrated in FIG. 8C, the fiber bundle wound on the outer periphery as described above is wound and overlapped on the same periphery multiple times; and at the same time, the fiber bundle in a lower layer and the fiber bundle in an upper layer are bonded together and fixed by way of, for example, epoxy resin. As a result, the section 521 multiply winding the fiber bundle at the start point of the holding member 50 will become a terminally processed section which is strong. Further, the terminally processed section has a large external diameter as described above. According to the present invention, the terminally processed section having a large diameter is assembled so as to be located outside of the stator core 21 in the axial direction.

Figure 9A:
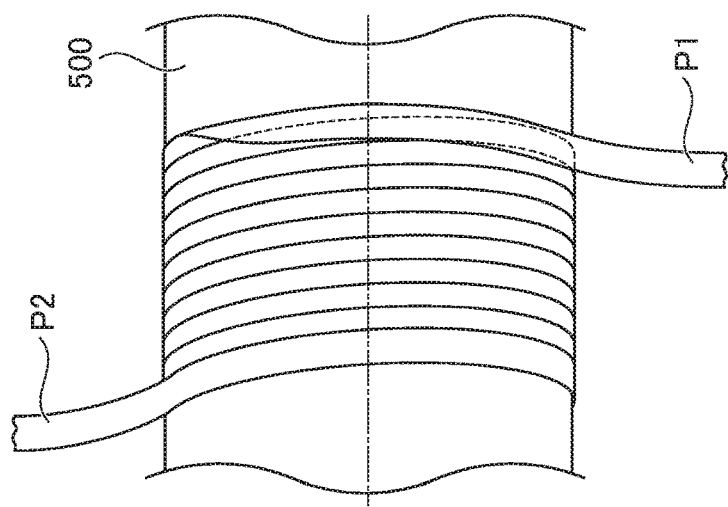
FIG. 9A is a diagram for illustrating an other example of the terminal processing at a start point of winding a fiber bundle of the holding member as an embodiment of the present invention, in which an aspect of starting winding the fiber bundle is illustrated.
Figure 9B:
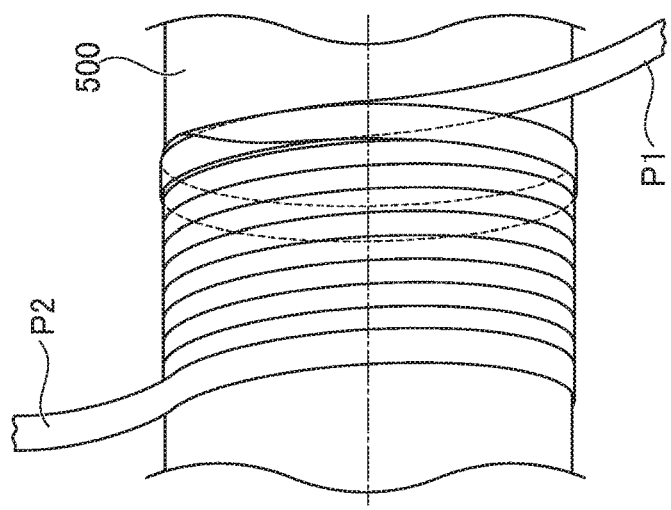
FIG. 9B is a diagram for illustrating the other example of the terminal processing at the start point of winding the fiber bundle of the holding member as an embodiment of the present invention, in which an aspect of preparing the terminal processing is illustrated.
Figure 9C:
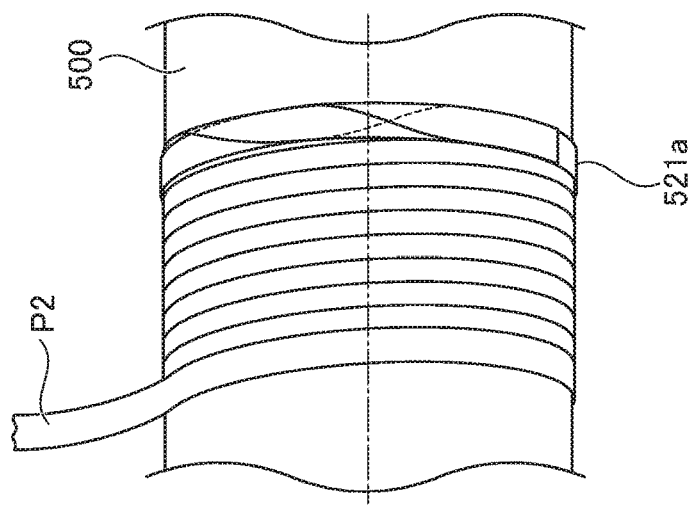
FIG. 9C is a diagram for illustrating the other example of the terminal processing at the start point of winding the fiber bundle of the holding member as an embodiment of the present invention, in which an aspect of the terminal processing is illustrated.

FIGS. 9A, 9B and 9C are diagrams for illustrating another example of the terminal processing at the start point of winding the fiber bundle of the holding member as an embodiment of the present invention. In the drawings, P1 denotes a fiber bundle to the start point side, and P2 denotes a fiber bundle to be wound to the end point side. FIG. 9A illustrates an aspect of starting winding the fiber bundle; FIG. 9B illustrates an aspect of preparing the terminal processing at the start point of winding the fiber bundle; and FIG. 9C illustrates an aspect of performing the terminal processing at the start point of winding the fiber bundle. As illustrated in FIG. 9A, when the winding of the fiber bundle is started by using the formation jig 500, in order to prevent the start point of the fiber bundle from being buried in the bottom layer by repeatedly winding the fiber bundle, an extra length of the start point of the fiber bundle is pulled out in advance prior to starting winding. As illustrated in FIG. 9B, the end of the fiber bundle, an extra length of which has been pulled out in advance as described above, is turned around along the border of the winding, and is wound on the outer periphery along the end of the winding. As illustrated in FIG. 9C, a first lap of the fiber bundle is wound on the outer periphery as described above, then passed underneath the fiber bundle at the end of the first lap, turned around along the border of a second lap of the fiber bundle, and is overlapped on the previous lap of the fiber bundle. The entire region, which includes the fiber bundle being passed underneath and the fiber bundle being overlapped on the end point, is bonded and fixed by way of resin such as epoxy resin. Such bonded fixation may be repeated multiple times. The resin used for bonded fixation may be applied when the fiber bundle is passed underneath or overlapped, or may impregnate the fiber bundle from above after overlapping. As a result, the section 521 multiply winding the fiber bundle at the start point of the holding member 50 will become a terminally processed section which is extremely strong. Further, the terminally processed section has a large external diameter as described above. According to the present invention, the terminally processed section having a large diameter is assembled so as to be located outside of the stator core 21 in the axial direction.

FIGS. 10A, 10B and 10C are diagrams for illustrating an example of the terminal processing at the end point of winding the fiber bundle of the holding member as an embodiment of the present invention. In the drawings, P3 denotes a fiber bundle to the end point side. FIG. 10A illustrates an aspect of finishing winding the fiber bundle at the end point; FIG. 10B illustrates an aspect of preparing the terminal processing at the end point of winding the fiber bundle; and FIG. 10C illustrates an aspect of performing the terminal processing at the end point of winding the fiber bundle. As illustrated in FIG. 10A, when the winding of the fiber bundle is finished by using the formation jig 500, an extra length of the end point of the fiber bundle is left unwound. As illustrated in FIG. 10B, the fiber bundle, an extra length of which is pulled out in advance as described above, is turned around along the border of the winding, while applying resin such as epoxy resin to the end; and the fiber bundle is passed underneath the previous lap of the fiber bundle, turned around along the border of a further lap of the fiber bundle, and is overlapped on the previous lap of the fiber bundle. The entire region, which includes the fiber bundle being passed underneath and the fiber bundle being overlapped on the end point, is bonded and fixed by way of resin such as epoxy resin. Such bonded fixation may be repeated multiple times. The resin used for bonded fixation may be applied when the fiber bundle is passed underneath or overlapped, or may impregnate the fiber bundle from above after overlapping. As illustrated in FIG. 10C, the entire region including the fiber bundle overlapped at the end point is bonded and fixed by way of resin such as epoxy resin. Such bonded fixation may be repeated multiple times. As a result, the section 522 multiply winding the fiber bundle at the end point of the holding member 50 will become a terminally processed section which is extremely strong. Further, the terminally processed section has a large external diameter as described above. According to the present invention, the terminally processed section having a large diameter is assembled so as to be located outside of the stator core 21 in the axial direction.

Figure 11:
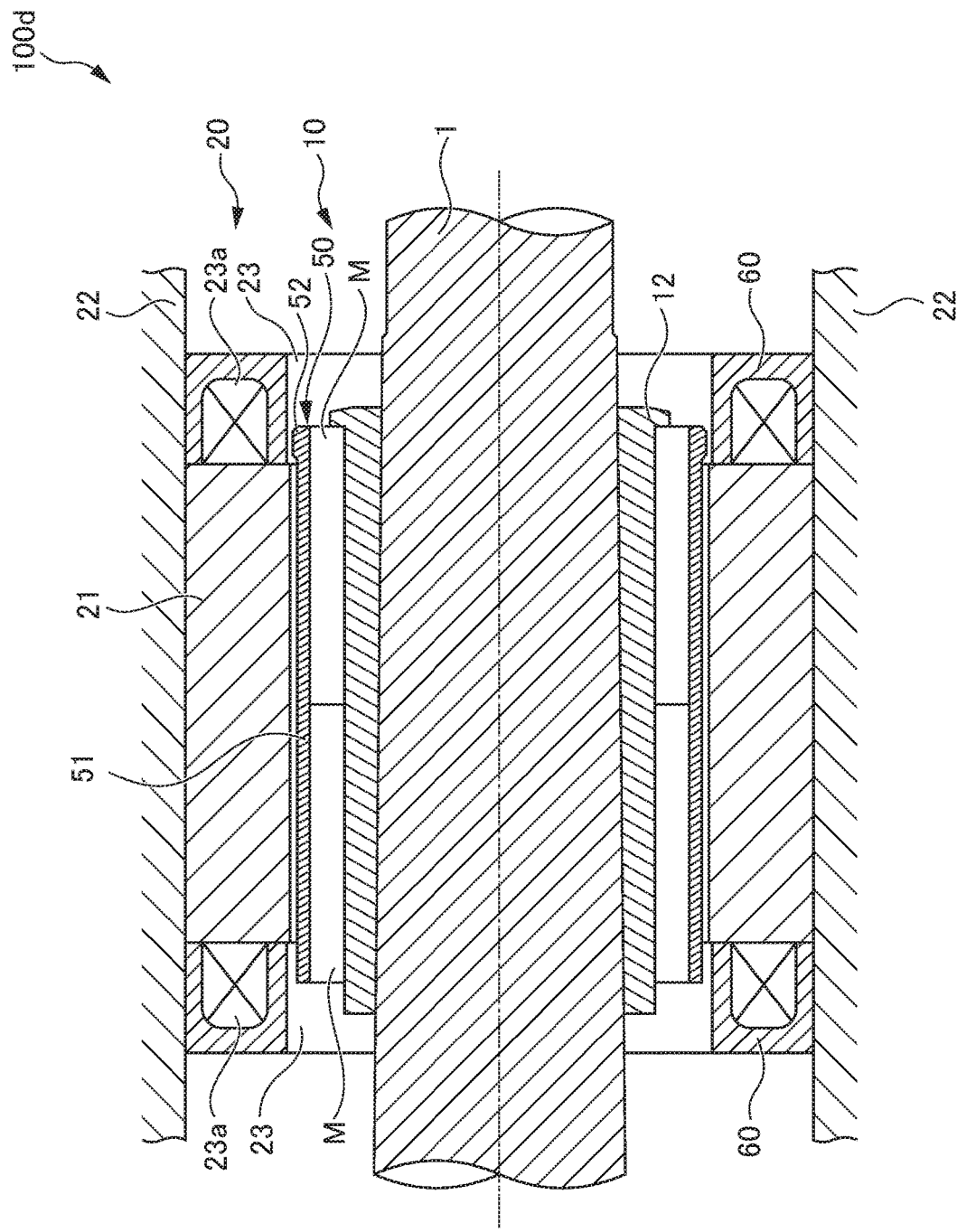
FIG. 11 is schematic configuration diagram illustrating a rotating electrical machine as a still another embodiment of the present invention.

FIG. 11 is schematic configuration diagram illustrating a rotating electrical machine as a still another embodiment of the present invention. A rotating electrical machine 100d illustrated in FIG. 11 is also a surface-mounted permanent-magnet synchronous motor; elements corresponding to those described above in FIGS. 1 to 3 are denoted by the same reference numbers, respectively; and the descriptions in FIGS. 1 to 3 shall apply to descriptions of the corresponding elements.

Differences between the rotating electrical machine 100d illustrated in FIG. 11 and the rotating electrical machines 100a to 100c described above with reference to FIGS. 1 to 3 are as follows. Namely, in the rotating electrical machines 100a to 100c, a mold is not in particular applied to the stator 20 including the stator core 21 and the coil 23; whereas, in the rotating electrical machine 100d illustrated in FIG. 11, a resin mold 60 is applied to the stator 20 including the stator core 21 and the coil 23. In general, when the length of the magnet M of the rotor 10 is longer than the length of the stator core 21 in the axial direction, lamination of the stator core 21 may peel off. Such peeling off may be significant in tooth sections of the stator core 21. In the rotating electrical machine 100d illustrated in FIG. 11, a resin mold 60 is applied to a section including the stator core 21, thereby overcoming the risk of such peeling off. Namely, a countermeasure to prevent a laminated core from peeling off is taken in the section to which the resin mold 60 is applied.

Figure 12:
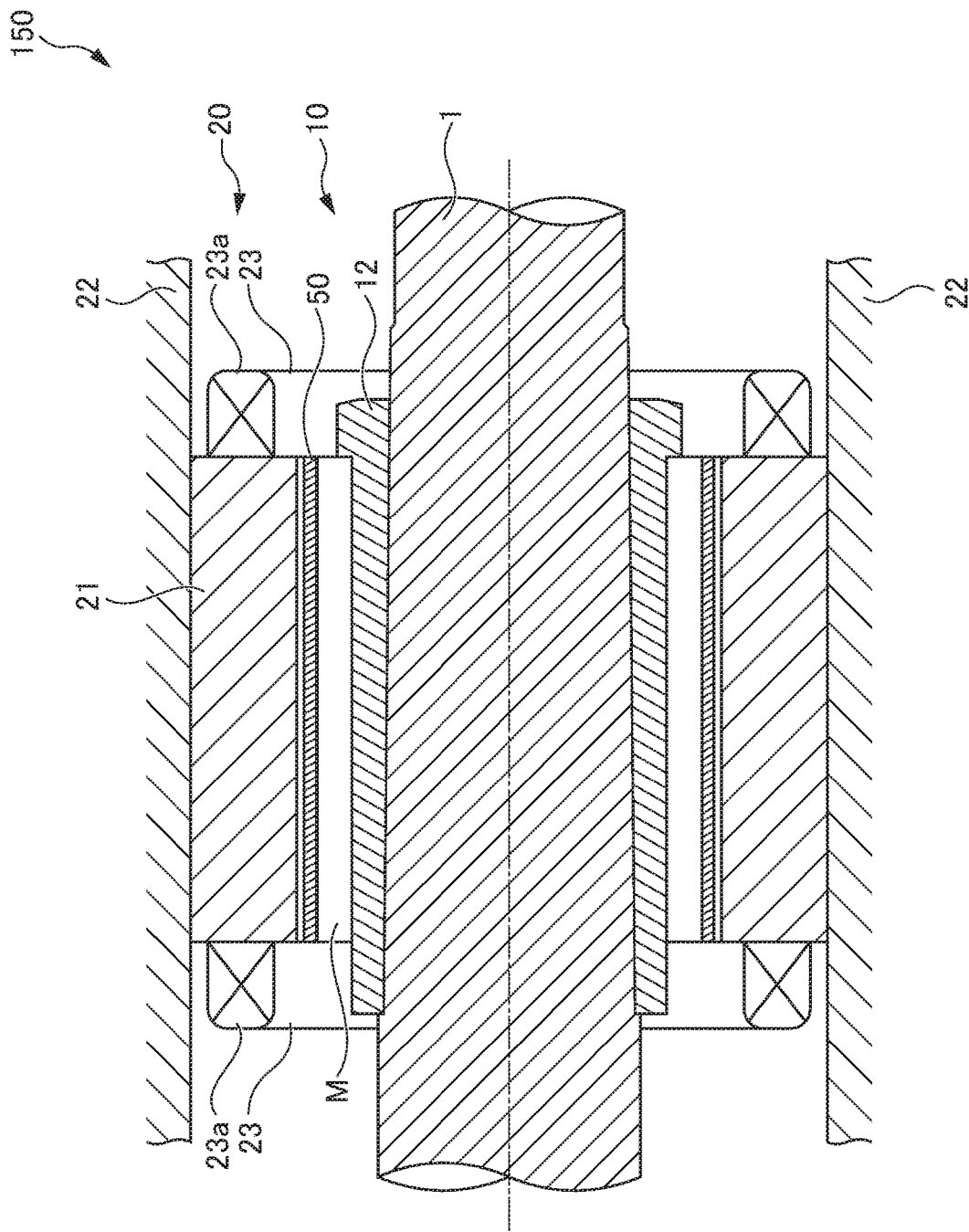
FIG. 12 is a schematic configuration diagram illustrating a typical rotating electrical machine.

Next, the function of the embodiment of the present invention as described above is discussed in comparison with a typical technology. FIG. 12 is a schematic configuration diagram illustrating a typical rotating electrical machine. A rotating electrical machine 150 thus illustrated includes a rotor 10 as an embodiment of the present invention; and the rotor 10 includes a typical holding member 50. In the rotating electrical machine 150 illustrated in FIG. 12, the rotor 10 is supported by way of a rotating shaft 1, both end sides of which are supported by way of bearings (not illustrated). A stator 20 is provided so as to surround the rotor 10. The stator 20 includes a stator core 21 formed by laminating, for example, thin magnetic steel sheets, and is incorporated in a housing 22. A coil 23 is wound on the stator core 21. A coil end 23a of the coil 23 wound on the stator core 21 is visible in the perspective of FIG. 12. The rotating electrical machine 150 illustrated in FIG. 12 is a surface-mounted permanent-magnet synchronous motor, in which a permanent magnet M is fixed to the rotating shaft 1 by way of a tapered sleeve 12 and the holding member 50. Namely, in the rotating electrical machine 150, the cylindrical tapered sleeve 12 made of a magnetic metallic material is press-fitted between the annular permanent magnet M and the rotating shaft 1; and the permanent magnet M is further surrounded by the holding member 50 that compressively holds the permanent magnet M inwards in the radial direction from the outer peripheral surface side; whereby the permanent magnet M is firmly held to the outer periphery of the rotating shaft 1. The holding member 50 forms a substantially cylindrical body.

As illustrated in FIG. 12, the length of the holding member 50 in the axial direction is equal with the length of the stator core 21 in the axial direction. Therefore, if the external diameter of the ends of the holding member 50 is as large as those in the above-described embodiments of the present invention, the holding member 50 may grind against the inner periphery of the stator core 21; or if the external diameter thereof is excessively large, even normal assembly cannot be performed. Therefore, it is difficult to sufficiently terminally process the ends of the holding member 50 such that the fiber bundle composing the holding member 50 would not be untied or entangled.

In contrast, in the embodiments described above with reference to FIGS. 1 to 11, the end sides of the holding member 50 are located outside of the ends of the stator core 21 in the axial direction; and there is no difficulty in designing the external diameter of the holding member 50 to be larger at the end sides of the holding member 50. Therefore, the holding member 50 can be manufactured to be sufficiently strong against a circumferential tensile force. Therefore, it is possible to realize a holding member, a rotor including the holding member, and a rotating electrical machine including the rotor, in which there is no risk of the holding member grinding against the stator, while maintaining a sufficient tensile force of the holding member of the magnet in the rotor of the rotating electrical machine.

Figure 13A:
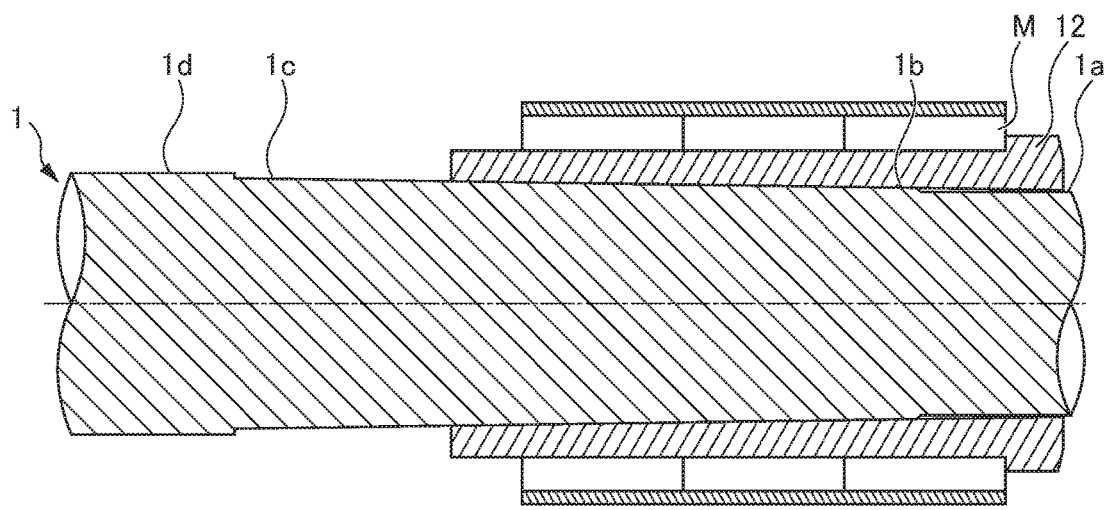
FIG. 13A is a diagram illustrating an aspect during the process of assembling the rotor of the rotating electrical machine.
Figure 13B:
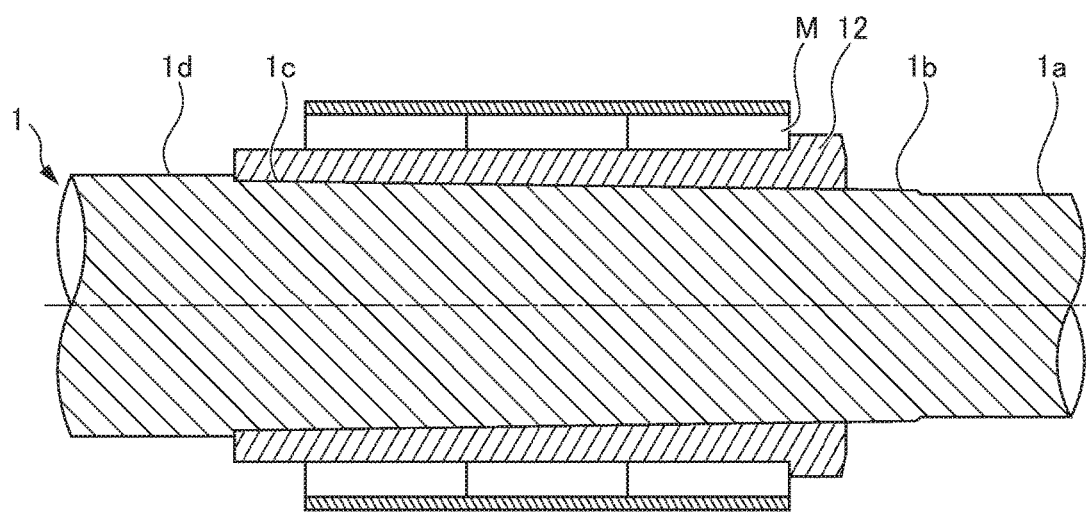
FIG. 13B is a diagram illustrating an aspect of having finished assembling the rotor to the rotating electrical machine.
Figure 14:
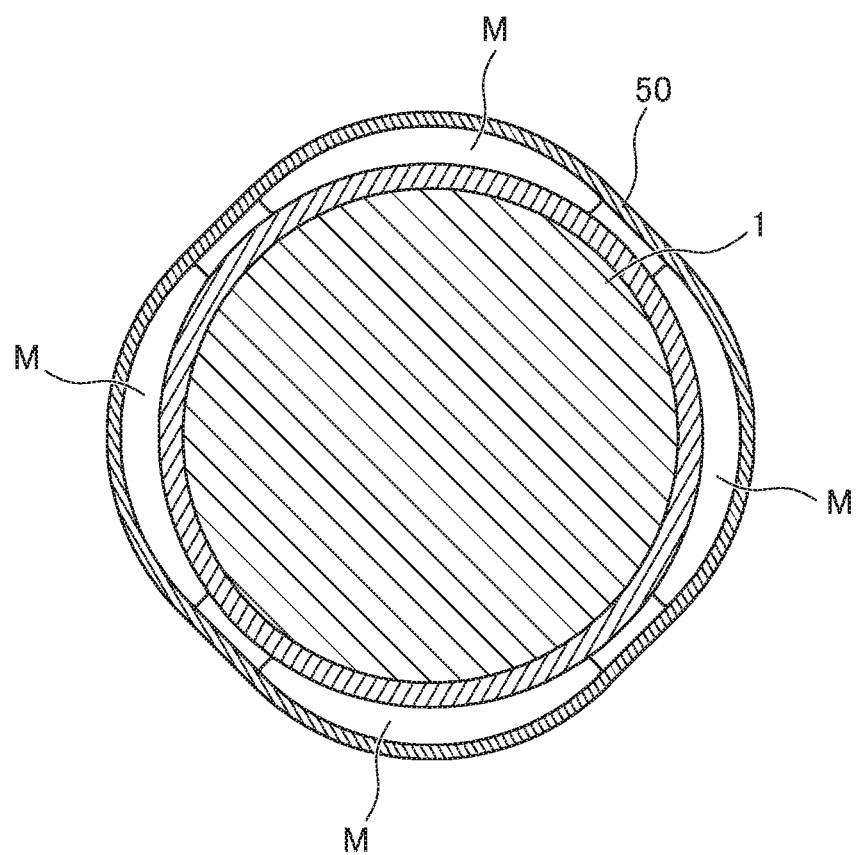
FIG. 14 is a diagram illustrating a cross section of the rotor of the rotating electrical machine.

FIGS. 13A and 13B are diagrams for illustrating a mechanism to apply tension to the holding member in the rotor of the rotating electrical machine. Further, FIG. 14 is a diagram for illustrating a cross section of the rotor of the rotating electrical machine. FIG. 13A illustrates an aspect during the process of assembling the rotor; and FIG. 13B illustrates an aspect of having finished assembling the rotor. The surface of the sleeve 12 and the surface the outer periphery of the rotating shaft 1 corresponding thereto are tapered. FIG. 13A illustrates the state before press-fitting, in which, firstly, a section 1a of the rotating shaft 1 having a relatively small diameter, which is illustrated on the right side in FIG. 13A, is inserted into an assembly, in which magnets M are arranged on the outer periphery of the sleeve 12, and the outer periphery of the magnets M is further surrounded by the holding member 50. In the above-mentioned state, the assembly is gradually shifted to sections 1b to 1c where the diameter of the rotating shaft 1 gradually increases. In this manner, the diameter of the sleeve 12 increases, and the magnets M are displaced outwards in the radial direction; as a result, the diameter of the holding member 50 increases as illustrated in FIG. 14. Note that a section 1d is a non-tapered section that is not covered by the sleeve 12. As a result of increasing the diameter of the holding member 50, a circumferential tensile force is generated in the holding member 50, and the magnets M are compressively held inwards in the radial direction, by virtue of an elastic restoring force corresponding to this tensile force. Namely, the holding member 50 firmly presses the magnets M against the outer periphery of the sleeve 12. The magnets M, which are pressed against as described above, are held in their position.

If the speed of the rotating electrical machine is desired to be further increased, or the torque is desired to be increased, when a magnet having a relatively large thickness dimension (namely, a relatively heavy magnet) is desired to be used, since the centrifugal force generated in the magnet is increased, the compressive holding power to be applied to the holding member 50 needs to be increased. In such instances, the interference between the sleeve 12 and the rotating shaft 1 can be increased as appropriate, the diameter of the holding member 50 can be further increased, and the tensile force can be increased, whereby the compressive holding power can be increased.

The embodiments of the present invention have been described above with reference to FIGS. 1 to 11, in comparison with the typical technology illustrated in FIG. 12. In particular, operation/working-effects of the holding member as an embodiment of the present invention can be summarized as follows. The terminally processed section, which is the start point and the end point of winding the fiber bundle composing the holding member, is located outside of the stator core, and therefore there is no risk of the terminally processed section grinding against the inner periphery of the stator core. Therefore, the fiber bundle can be multiply wound and overlapped in a further elaborate manner, without any restriction on the upper limit of the thickness. This achieves the effects of further strongly fixing the ends, and further reducing the risk of loosening the fiber. Moreover, the amount of the resin used for fixing the ends can be sufficiently increased without any restriction on the upper limit of the coating thickness, which in turn achieves the effects of further strongly fixing the ends, and further reducing the risk of loosening the fiber. The foregoing factors achieve effects that the holding member will not peel off or loosen during the rotation, and the long-term reliability and strength can be enhanced. Still further, the holding power of compressively holding the rotor towards the center of the axis in the radial direction can be enhanced, which in turn achieves an effect that the maximum speed of rotation of the rotor can be increased without damaging the reliability of the rotor. This consequently achieves an effect that the output of the rotating electrical machine can be increased. Furthermore, a thicker magnet can be used, which in turn brings about a significant advantage that the torque can be increased, and the output of the electric motor can be improved.

Note that the present invention is not limited to the above-described embodiments, and can be implemented through alterations and changes in various ways; and alterations and improvements within the scope that can achieve the object of the invention are encompassed by the present invention.

What is claimed is:

1. A holding member applied to a rotating electrical machine, the rotating electrical machine comprising: a stator including a stator core; a rotor supported by way of a rotating shaft and corresponding to the stator; a plurality of magnets arranged on an outer periphery of the rotor; and a holding member that compressively holds the magnets inwards in a radial direction from an outer periphery side of the magnets, wherein the holding member comprises: a main section that forms a substantially cylindrical body and is composed primarily of a fiber bundle wound on, as circling around, a peripheral surface of the main section per se; and a terminally processed section provided at an end of the main section, the terminally processed section including a region that is terminally processed for preventing the fiber bundle from being untied from at least any one of a start point and an end point of winding the fiber bundle, and wherein a length of the main section in an axial direction is longer than a length of the stator core in the axial direction; and the terminally processed section is arranged so as to be located outside of an end of the stator core in the axial direction, wherein an external diameter of the terminally processed section, formed on an end portion extended from the main section, is larger than an external diameter of the main section, and wherein an external diameter of an opposite side end portion, oppositely extended from the main section in the axial direction, is smaller than an inner diameter of the stator core, wherein the opposite side end portion is formed without the terminally processed section.

2. A rotor comprising the holding member according to claim 1.

3. The rotor according to claim 2, wherein a length of the holding member in the axial direction is equal to a length of the magnets in the axial direction.

4. A rotating electrical machine comprising the rotor according to claim 3, wherein an end of the stator core composes a section configured with a countermeasure to prevent a laminated core from peeling off.

5. The rotor according to claim 2, wherein an outer periphery of the rotating shaft coaxially comprises: the holding member configured to include carbon fiber; and a tapered sleeve located further inwards in relation to the holding member in a radial direction, the tapered sleeve including a tapered surface, an inner periphery of which is sloped in the axial direction, wherein the holding member receives a radially expanding force from the tapered surface on the outer periphery of the rotating shaft, the holding member is fitted to the rotating shaft via the magnets and the tapered sleeve, whereby a tensile force acts on the holding member; and the tensile force generates an elastically compressive force, which in turn presses the magnets against the outer periphery of the tapered sleeve.

6. A rotating electrical machine comprising the rotor according to claim 2, wherein the terminally processed section of the holding member is located outside of an end of the stator core in the axial direction.

* * * * *